No. 838,901. PATENTED DEC. 18, 1906.
G. RHEINGANS.
HITCHING BOLT.
APPLICATION FILED MAY 31, 1906.
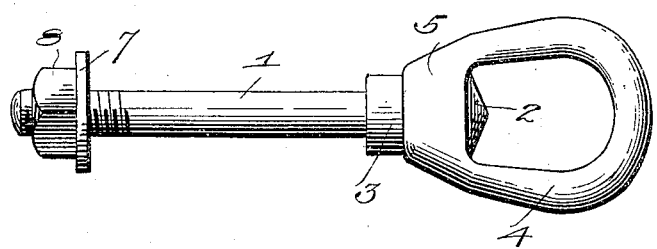
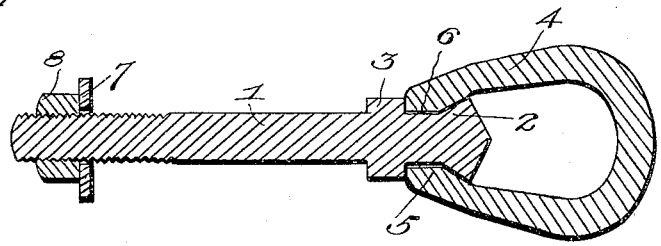
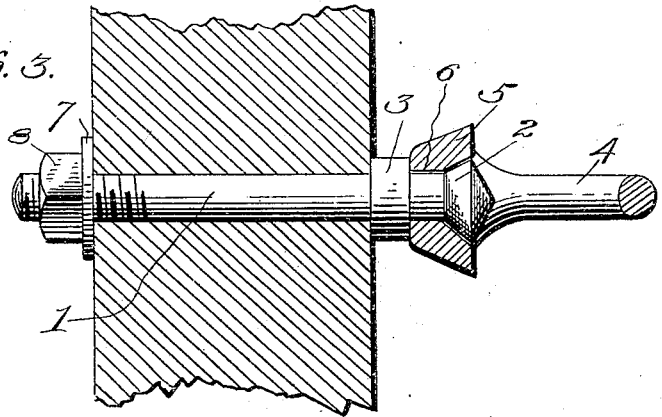

UNITED STATES PATENT OFFICE.

GEORGE RHEINGANS, OF BLOOMER, WISCONSIN.

HITCHING-BOLT.

No. 838,901.  Specification of Letters Patent.  Patented Dec. 18, 1906.

Application filed May 31, 1906. Serial No. 319,653.

*To all whom it may concern:*

Be it known that I, GEORGE RHEINGANS, a citizen of the United States, residing at Bloomer, in the county of Chippewa and State of Wisconsin, have invented certain new and useful Improvements in Hitching-Bolts; and I do declare the following to be a full, clear, and exact description of the invention, such as will enable others skilled in the art to which it appertains to make and use the same.

This invention relates to improvements in hitching-bolts.

The object of the invention is to provide a hitching-bolt adapted to be secured to a manger or other fixture and having means whereby a halter-strap or tie-rope may be secured thereto and prevented from becoming twisted or knotted by the movement of the animal fastened thereby.

A further object is to provide a device of this character which will be simple, strong, and durable in construction, efficient in operation, and well adapted to the purpose for which it is designed.

With the above and other objects in view the invention consists of certain novel features of construction, combination, and arrangement of parts, as will be hereinafter described and claimed.

In the accompanying drawings, Figure 1 is a side view of a hitching-bolt constructed in accordance with the invention. Fig. 2 is a longitudinal vertical sectional view through the same; and Fig. 3 is a sectional view of a portion of a manger and the bolt, showing the manner of securing the latter in place.

Referring more particularly to the drawings, 1 denotes the bolt, which is provided on one end with an inwardly-tapered head 2, adjacent to which and spaced a suitable distance therefrom is an annular flange or collar 3, which is preferably formed integral with the bolt, as shown. Between the collar 3 and the head 2 is mounted a swiveled ring 4, said ring being here shown and is preferably substantially elliptical in shape and has at its inner end an enlarged portion 5, in which is formed a tapered longitudinally-disposed passage 6, in which the head 2 of the bolt is seated. By thus securing the ring 4 to the end of the bolt said ring will turn freely thereon. The opposite end of the bolt 1 is threaded and has arranged thereon a washer 7 and a nut 8, by means of which the bolt may be firmly attached to a manger or other support. In applying the bolt to the manger a small hole is bored through the front side thereof, through which the bolt is inserted until the flange or collar 3 bears against the outer surface of the side of the manger, after which the washer is placed on the inner end of the bolt and the nut 8 screwed up to clamp said washer into tight engagement with the inner side of the manger, thereby rigidly securing the bolt in place. With the parts in position as described a tie-rope or halter-strap may be fastened in the ring 4, which will freely turn with the movement of the strap, thereby preventing the latter from becoming twisted or knotted.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claim.

Having thus described my invention, what I claim as new, and desire to secure by Letters Patent, is—

A hitching device comprising a bolt and an attaching member mounted to a swivel thereon, said member being composed of a loop having an enlarged end provided with a socket to engage one end of said bolt and means for securing said bolt to a support.

In testimony whereof I have hereunto set my hand in presence of two subscribing witnesses.

GEORGE RHEINGANS.

Witnesses:
GEO. T. PLEHN
H. W. SMITH.